United States Patent [19]

Telldén

[11] Patent Number: 5,193,658
[45] Date of Patent: Mar. 16, 1993

[54] ADJUSTABLE MECHANICAL STOP OF AN INDUSTRIAL ROBOT

[75] Inventor: Leif Telldén, Västerås, Sweden
[73] Assignee: Asea Brown Boveri AB, Västerås, Sweden
[21] Appl. No.: 827,750
[22] Filed: Jan. 29, 1992
[30] Foreign Application Priority Data
Feb. 11, 1991 [SE] Sweden .................. 9100403
[51] Int. Cl.⁵ .................. F16D 71/04; B25J 19/00
[52] U.S. Cl. .................. 192/138; 74/815; 74/816; 192/149; 901/11; 901/13
[58] Field of Search .............. 192/138, 148, 149, 139; 248/658; 74/815, 816; 403/117; 901/11, 13

[56] References Cited
U.S. PATENT DOCUMENTS

| | | | |
|---|---|---|---|
| 3,954,188 | 5/1976 | Boyle | 414/735 |
| 4,514,136 | 4/1985 | Abe | 901/13 X |
| 4,606,667 | 8/1986 | Bailey | 192/149 X |
| 4,816,955 | 3/1989 | Bruns et al. | 901/13 X |
| 4,934,504 | 6/1990 | Torii | 901/13 X |

FOREIGN PATENT DOCUMENTS
0241556 10/1987 European Pat. Off. .

Primary Examiner—Rodney H. Bonck
Attorney, Agent, or Firm—Watson, Cole, Grindle & Watson

[57] ABSTRACT

The invention relates to an industrial robot with a stand (1) which is rotatably journalled in a base (2) and provided with a mechanical stop for limiting the rotary motion of the stand. The stop comprises at least one radially projecting stop arm (7), which in a certain rotational position makes contact with a stop pin (6) arranged on the base (2). The rotary moment is taken up by deformation of the stop pin (6). The stand (1) is provided with a plurality of recesses (8, 10) arranged around the periphery of the stand, whereas the stop arm (7) is formed with at least one fixing projection (12, 13) which is adapted to the recesses and which, with the aid of a wedge member (14), may be fastened into one of the recesses at an optional location on the periphery of the stand.

10 Claims, 4 Drawing Sheets

ADJUSTABLE MECHANICAL STOP OF AN INDUSTRIAL ROBOT

TECHNICAL FIELD

The present invention relates to an industrial robot comprising a stand which is rotatably mounted in a base and on which at least one radially projecting stop arm is fixed, which is adapted to cooperate with a stop dog arranged on the base for limiting the operating range of the robot.

BACKGROUND ART

An industrial robot is usually programmed to operate within a certain operating range. In addition, for safety reasons, there is often prescribed that the operating range for certain of the axes of the robot is to be limited, from the point of view of hardware, by mechanical or electrical stop means. This brings about an emergency shutdown of the robot if, for example because of a fault in the control system, it would attempt to move outside the programmed operating range.

In hitherto known robots of the design described in the introduction, where a mechanical stop means is arranged between the rotatable stand and the fixed base, the stop arm and the stop dog are fixed into holes on the stand and the base, respectively, by means of bolts. Changing the operating range for such a robot is difficult and time-wasting, since this necessitates boring and threading an additional number of holes for attachment of the stop arm or the stop dog. Robots of this kind are described in European patent publication 0,241,556 and U.S. Pat. No. 3,954,188.

SUMMARY OF THE INVENTION

A primary object of the present invention is to provide a robot with a mechanical stop means for the rotating robot stand which is arranged such that the operating range of the robot can be limited arbitrarily in a simple manner for adaptation to the special conditions prevailing at the location where the robot is to work. This is achieved according to the invention by providing the stand with recesses in the form of open pockets arranged around the periphery of the stand and forming the stop arm with at least one fixing projection adapted to the recesses and providing the stop arm with fixing means for fastening the stop arm with the fixing projection in such a recess at an optional location on the periphery of the stand. The embodiment of the stop means permits its stop arm to be simply moved to the desired location around the periphery of the rotating stand. The recesses can be achieved in connection with the founding of the robot parts so that the need of machining is minimized. In this way, an adjustable stop means is obtained without having to bore a number of holes for attachment. In addition, the stop arm and the stop dog made in the form of a pin are easily replaceable.

Suitable further developments of the invention will be clear from the dependent claims.

BRIEF DESCRIPTION OF THE DRAWINGS

The invention will be explained in greater detail by means of examples with reference to the accompanying drawings, wherein.

DESCRIPTION OF THE PREFERRED EMBODIMENT

Figure 1:
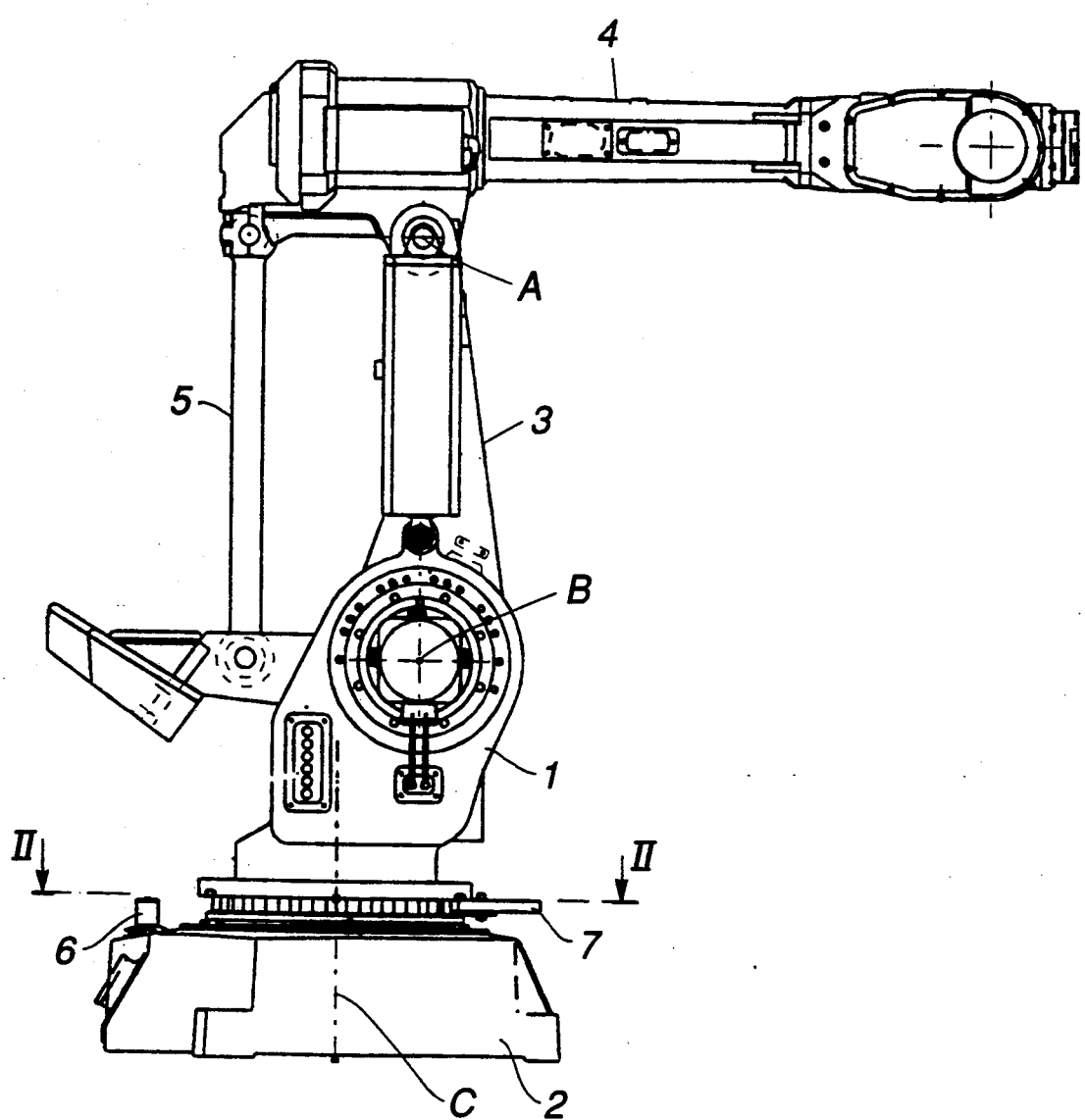
FIG. 1 is a side view of an industrial robot with a mechanical stop means according to the present invention.

The industrial robot shown in FIG. 1 has a stand 1 which is rotatably journalled, by means of a bearing 26 (FIG. 9), in a base 2 fixable to a mounting base, the stand thus being pivotal around a vertical axis C. A first robot arm 3 is pivotally journalled in the stand 1 around an axis B. At the upper end of the arm 3 a second robot arm 4 is pivotally journalled around an axis A. The pivoting of the arm 4 is performed over a parallel rod 5, the lower end of which is connected to a drive unit built into the stand 1.

The operating range of the axes A, B and C is limited for safety reasons with the aid of mechanical and electrical stop means. The rotary motion of the stand 1 around the axis C is thus limited by a mechanical stop means consisting of a stop pin 6 fixed in the fixed base 2 and a stop arm 7 which is fixed on the rotatable stand and which makes contact with the stop pin 6 in a certain rotational position.

Figure 2:
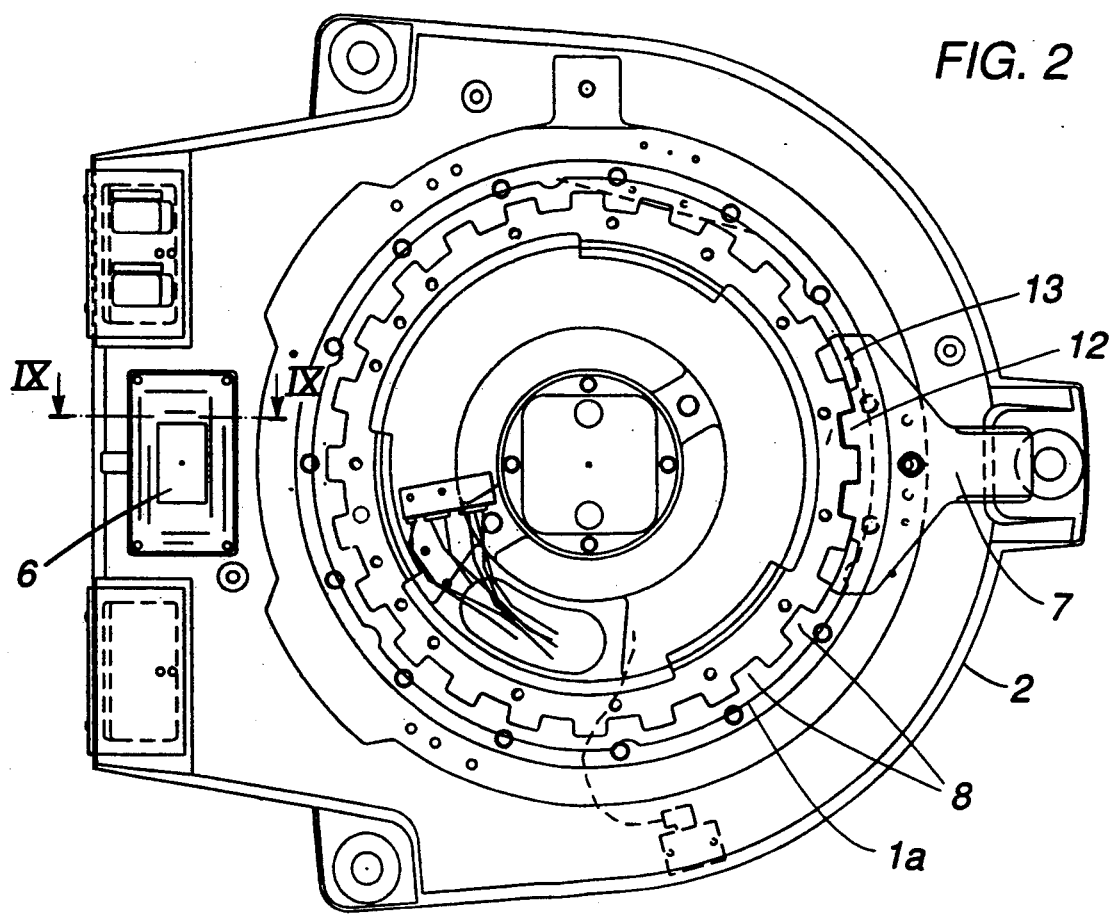
FIG. 2 shows the lower part of the robot in a section along the line II—II in FIG. 1.
Figure 3:
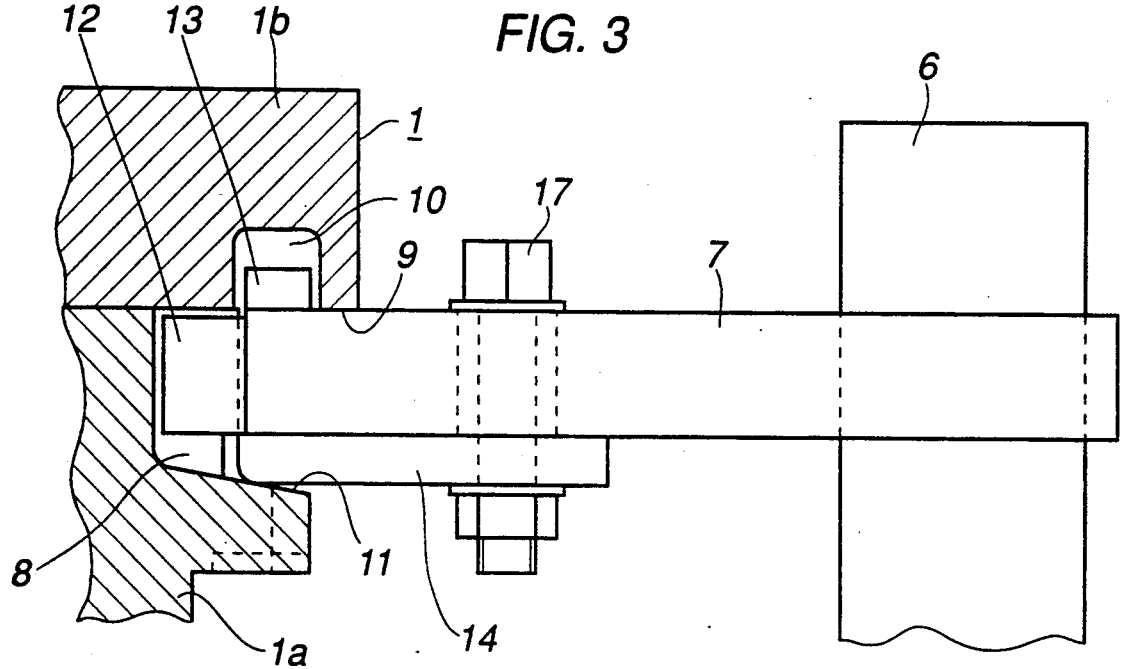
FIG. 3 is a side view of a stop arm fixed on the periphery of the rotatable robot stand.

The stand 1 may suitably be composed of a lower part 1a and an upper part 1b (FIG. 3). The lower part 1a (FIG. 2) is provided with a large number, 24 in the example shown, of pockets 8 arranged around the periphery of the stand in equidistant relationship to each other and being open radially outwards. In its surface 9 facing the lower stand part, the upper stand part 1b is provided with a surrounding circular slot 10 which is concentric with the rotary axis (C) of the stand. The pockets 8 and the slot 10 form an attachment for the stop arm 7 and are accessible through an inlet opening which is limited by the stand surface 9, oriented perpendicularly to the rotary axis of the stand, and by a stand surface 11 which is inclined in relation to the surface 9.

Figure 4:
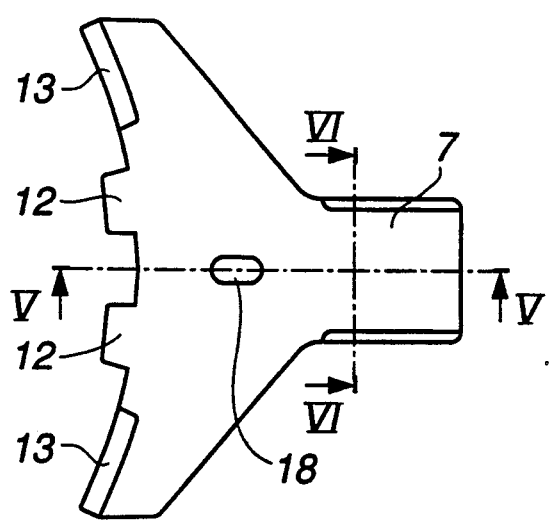
FIG. 4 is a plan view of the stop arm.
Figure 5:
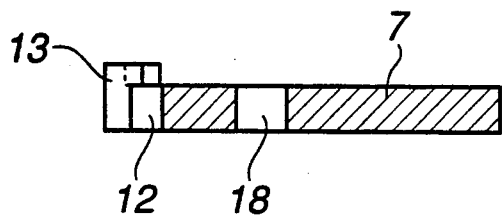
FIG. 5 shows the stop arm in a longitudinal section along the line V—V in FIG. 4.
Figure 6:
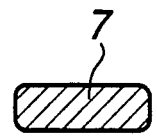
FIG. 6 shows the stop arm in a cross section along the line VI—VI in FIG. 4.
Figure 7:
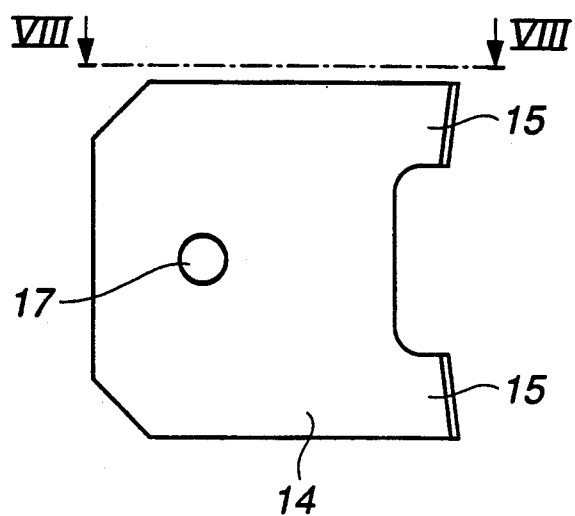
FIG. 7 is a plan view of a fixing wedge for the stop arm.
Figure 8:
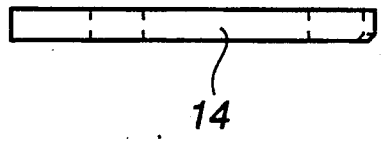
FIG. 8 is a side view of the fixing wedge in the direction VIII in FIG. 7, FIG. 9 in a section along the line IX—IX in FIG. 2 a stop pin arranged in the stationary base.

The embodiment of the stop arm 7 is clear from FIGS. 4-6. It consists of a plate with a fixing edge which is adapted to the peripheral curvature of the stand and which is formed with two centrally arranged first fixing projections 12, positioned in the plane of the plate, as well as two second fixing projections 13 placed at respective ends of the fixing edge and projecting from the plane of the plate. The first-mentioned fixing projections 12 are each adapted to be inserted into a respective one of the locking pockets 8, whereas the other two fixing projections 13 are adapted to be inserted into the circular slot 10, as will be clear from FIG. 3. The stop arm is locked to the stand with the aid of a wedge member 14, the embodiment of which is clear from FIGS. 7 and 8. The wedge member consists of a plate, the edge of which, facing the periphery of the stand, exhibits two oblique-angled teeth 15 adapted to be pressed in between the inclined stand surface 11 and the first-mentioned fixing projections 12 (FIG. 3). The wedge member is locked to the stop arm 7 with the aid of a screw 16 provided with a nut which passes through a fixing hole 17 in the wedge member and an elongated fixing hole 18 in the stop arm 7, whereby the wedge member 14 can be displaced in the radial direction relative to the stop arm 7 when the screw 16 is not tightened.

Figure 9:
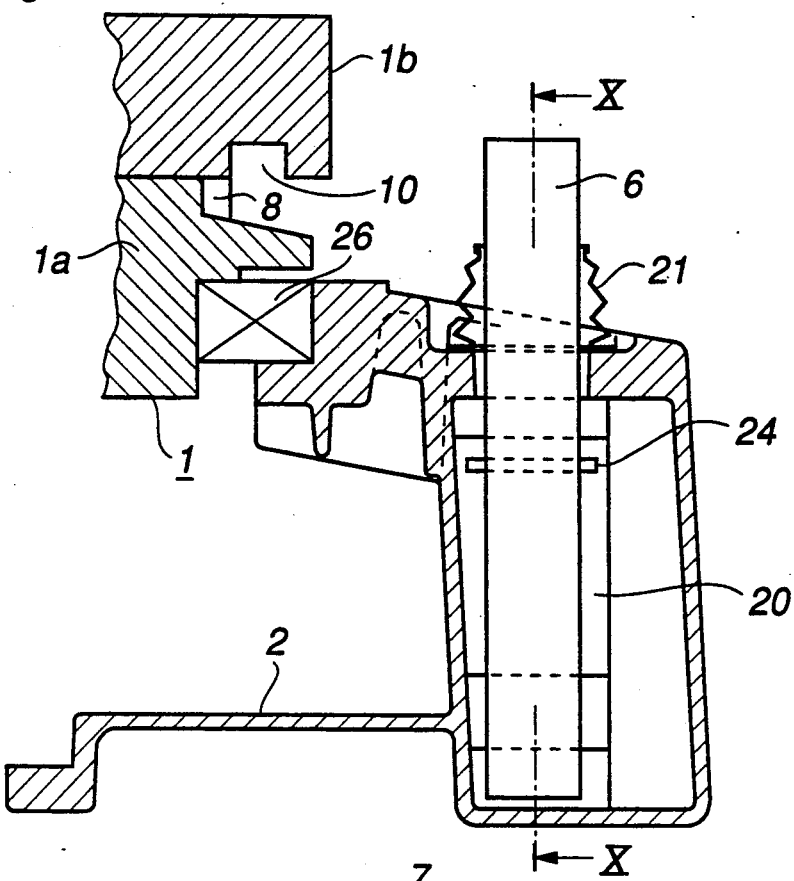
Figure 10:
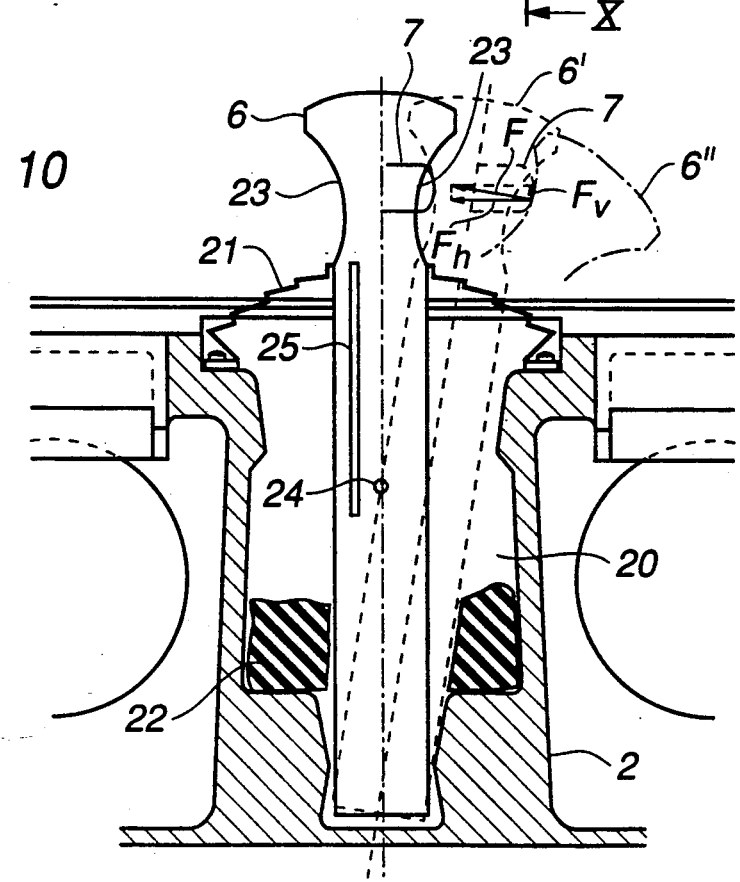
FIG. 10 shows the stop pin in a section along the line X—X in FIG. 9.

FIGS. 9 and 10 show how the stop pin 6 is arranged in a pocket 20 in the base 2. The pin is loosely arranged in the pocket in such a way that it is able to tilt in the tangential direction when being influenced by the stop arm 7. The upper part of the pin is provided with a rubber bellows 21, the main task of which is to protect against the accumulation of dirt, water, etc. in the pocket 20. In non-influenced state, the pin is kept in its vertical position, shown in unbroken lines in FIG. 10, by the rubber bellows 21 and possibly by additional elastic centering members, for example in the form of cushions 22 of soft rubber, arranged in the pocket 20.

The stop pin 6 is intentionally dimensioned so as to become deformed if the stop arm 7, on exceeding the programmed operating range of the robot, is pressed against the pin while being influenced by the drive unit of the robot stand. FIG. 10 shows the pin 6, besides in its normal position, also in the position when the stop arm 7 contacts the stop pin during the initial stage of the deformation of the stop pin (dashed line designated 6') as well as in deformed state (dot-dashed line designated 6'').

While the pin is being deformed, the stop arm 7 is influenced by a force F with components $F_h$ and $F_v$. The upward component $F_v$ counteracts the forces which lock the stop arm in the slot 10 by means of the wedge member 14. It is therefore desirable to minimize this force component. This has been achieved by forming the upper part of the stop pin with two circular-cylindrical indentations 23, extending tangentially from opposite directions, which constitute stop surfaces for the stop arm 7. Because of the curvature of the surfaces, the upward force component which influences the stop arm when this is pressed against the pin will be considerably smaller than if the pin were formed with plane stop surfaces.

A tubular pin 24 is positioned in a transversal hole in the stop pin 6 and prevents the stop pin from being pulled out of the pocket 20 when the stop pin is obliquely tilted under the influence of the stop arm 7. In its vertical position, however, the stop pin can be easily detached without being obstructed by the tubular pin since the tubular pin may then freely pass up through slots arranged for that purpose in the side walls of the pocket 20.

When the stop pin 6 has been deformed, it is important that the pin is replaced before the robot is again put into operation. For this purpuse the stop pin may be provided with a ceramic tube 25, fixed in a longitudinal slot in the surface of the pin, with an internal or external plating of electrically conducting material, for example gold or silver. The tube is provided with connecting conductors with contacts for connection into an electric protective circuit. If the stop pin is deformed to an extent corresponding to a bend of, for example, 5°, the ceramic tube will be broken, the electrical connection between its ends thus being broken, which causes emergency shutdown of the robot.

The invention is not limited to the embodiment shown, but several variants are feasible within the scope of the claims. For example, the slot 10 need not consist of a continuous circular slot but may be divided into a plurality of locking pockets which may then replace the pockets 8. Further, the two stand parts 1a and 1b may be integrated into one single body.

Only one stop arm 7 is shown in the drawings. For a stricter limitation of the operating range, however, two such stop arms are required.

I claim:

1. An industrial robot comprising a stand which is rotatably journalled in a base (2) and on which at least one stop arm (7) is fixed, said stop arm being adapted to cooperate with a stop dog (6), arranged on the base (2), for limiting the operating range of the robot, said stand (1) being provided with recesses (8, 10) in the form of open pockets arranged around the periphery of said stand and having an inlet opening tapering in an inward direction, said stop arm (7) being formed with at least one fixing projection (12, 13) engageable with the recesses and being provided with a wedge member (14) for fastening the stop arm with the fixing projection (12, 13) in one of the recesses at an optional location on the periphery of the stand.

2. An industrial robot according to claim 1, wherein said pockets (8) are open radially outwardly and arranged around the periphery of the stand (1) in equidistant relationship to each other.

3. An industrial robot according to claim 1, wherein said recesses comprise a circular slot (10) which is provided in a first stand surface (9) oriented substantially perpendicularly to the rotary axis (C) of the stand and which is concentric with said axis.

4. An industrial robot according to claim 3, wherein said inlet opening is limited by said first stand surface (9) as well as by a second stand surface (11) which is inclined in relation to said first stand surface (9), said second stand surface (11) being adapted to cooperate with said wedge member.

5. An industrial robot according to claim 4, wherein the stop arm (7) consists of a plate with a fixing edge which is engageable with the periphery of the stand and which is formed with at least one first fixing projection (12) which is positioned in the plane of the plate and adapted to be inserted into one of the radial pockets (8) as well as at least one second fixing projection (13) projecting from the plane of the plate and adapted to be inserted into the circular slot (10).

6. An industrial robot according to claim 5, wherein the wedge member (14) consists of a plate which may be screwed to the stop arm (7) and which is displaceable in a radial direction in relation to said stop arm (7), the edge of said plate, facing the periphery of the stand, exhibiting at least one tooth (15) which is adapted to be inserted between said inclined stand surface (11) and said first fixing projection (12).

7. An industrial robot according to claim 1, wherein the stop dog consists of a pin (6) which projects from a pocket (20) arranged in the base, the pin being dimensioned such that it is deformed if the stop arm (7), upon exceeding a predetermined operating range of the robot, is pressed against the pin (6) under the influence of the drive unit of the robot stand (1).

8. An industrial robot according to claim 7, wherein the upper end portion of the stop pin (6) is formed with two indentations (23), serving as stop surfaces for the stop arm and arranged tangentially from opposite directions, said indentations being formed such that the upward force component, which arises in case of a mechanical stop and which influences the stop arm (7) when this is pressed against the pin (6), is minimized.

9. An industrial robot according to claim 7, wherein a deformation-sensing member (25) included in an electric protective circuit is arranged in the stop pin (6), said member (25) being adapted to bring about emergency shutdown of the robot if the pin is deformed above a certain limit.

10. An industrial robot according to claim 9, wherein the deformation-sensing member consists of a ceramic tube (25) with a plating of electrically conducting material fixed in a slot in the surface (6) of the stop pin.

* * * * *